United States Patent [19]

Costa

[11] Patent Number: 5,555,711
[45] Date of Patent: Sep. 17, 1996

[54] LAWN RAKE WITH SPRING PIVOTING HEAD

[76] Inventor: Richard G. Costa, 2 Milton St., Seekonk, Mass. 02771

[21] Appl. No.: 496,394

[22] Filed: Jun. 29, 1995

[51] Int. Cl.⁶ ........................................ A01D 7/06
[52] U.S. Cl. ........................ 56/400.2; 403/111; 403/146
[58] Field of Search .................... 56/400.2, 400.08, 56/400.19, 400.21; 403/146, 111

[56] References Cited

U.S. PATENT DOCUMENTS

| | | | |
|---|---|---|---|
| 4,212,150 | 7/1980 | Dmochowski | 56/400.2 X |
| 4,351,145 | 9/1982 | Farkas | 56/400.19 X |
| 5,249,413 | 10/1993 | McDonough, Jr. | 56/400.16 |

*Primary Examiner*—Terry Lee Melius
*Attorney, Agent, or Firm*—John P. McGonagle

[57] ABSTRACT

A lawn rake incorporating a spring element which is adapted to provide a "throwing" capability in the rake head. The spring element urges the rake head into a position at an acute angle to the longitudinal axis of the rake handle.

9 Claims, 4 Drawing Sheets

LAWN RAKE WITH SPRING PIVOTING HEAD

BACKGROUND OF THE INVENTION

This invention relates to lawn rakes, and in particular to a rake with a spring pivoting head.

Lawn rakes are generally light weight tools used for gathering grass, leaves, light debris, and the like. Lawn rakes are used sporadically and often by persons not used to or not capable of heavy manual labor. Prior art rakes have attempted to address the physical limitations of rakers by using lighter materials in rake construction and by using tines made more flexible by the use of aluminum and plastic materials in their construction. However, prior art rakes still require a great deal of upper body strength and flexibility to manipulate a lawn rake which often requires a scooping and throwing motion to handle the light materials being raked.

SUMMARY OF THE INVENTION

In view of the foregoing disadvantages inherent in the known types of devices now present in the prior art, the present invention provides an improved lawn rake. As such, the general purpose of the present invention, which will be described subsequently in greater detail, is to provide a new and improved lawn rake which has inherent raking power built into the rake thereby lessening the upper body strength and flexibility required of the raker.

To attain this, the present invention incorporates into a rake a spring element which is adapted to provide a "throwing" capability in the rake head. The spring element urges the rake head into a position at an acute angle to the longitudinal axis of the rake handle. Prior art rakes keep the rake head and handle in the same general longitudinal axis. In operation, a raker's natural first raking motion with the present invention rake, will cause the rake head and rake handle to acquire the same general longitudinal axis, thereby tensioning the spring element and storing energy therein. A simple and small lifting motion of the rake will release the energy in the spring causing the raking head to return to its acute angle position with the rake handle, thereby "throwing" the raked debris forward.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
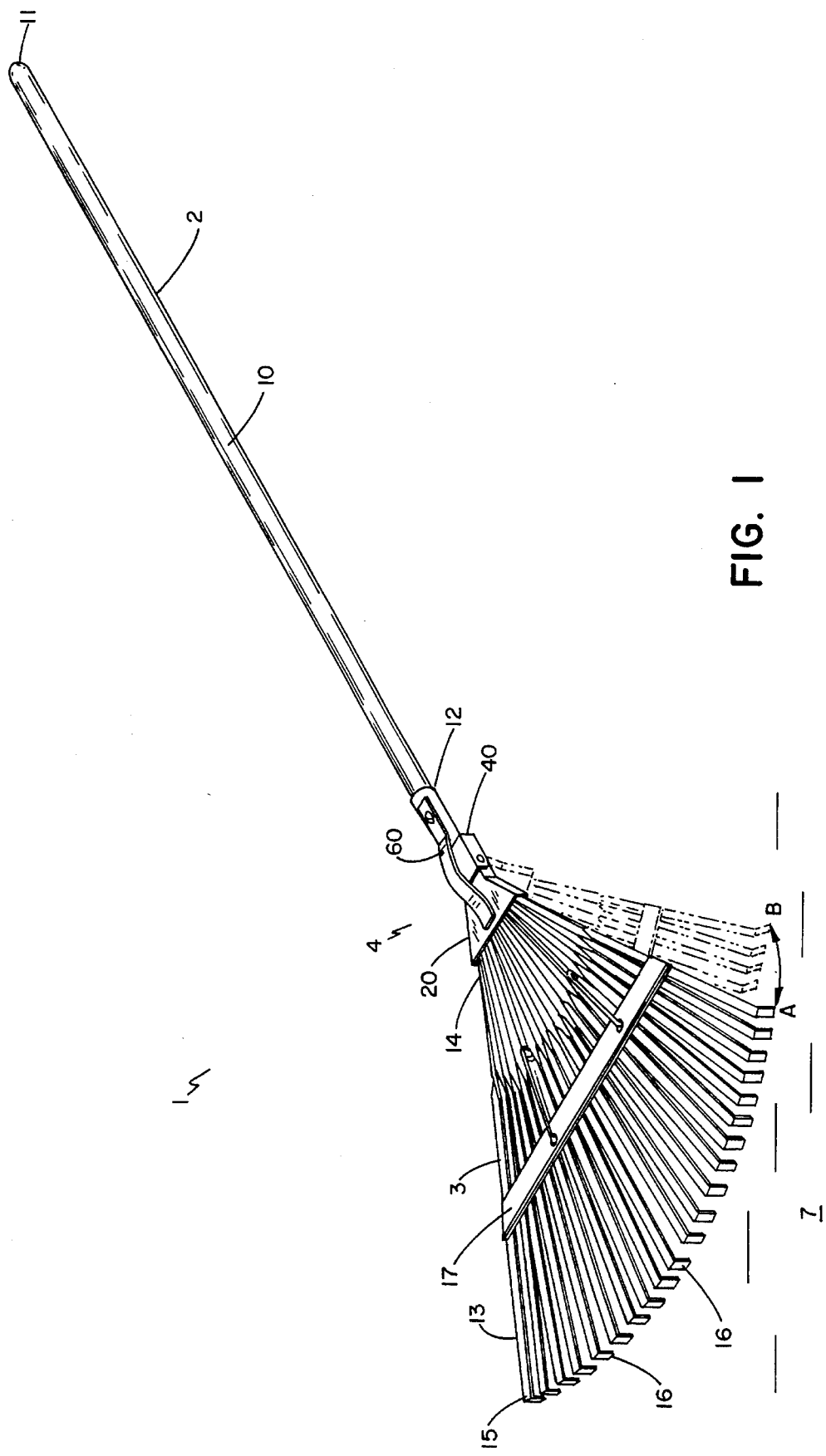
FIG. 1 is a perspective view of the rake of the present invention in an engaged position.
Figure 2:
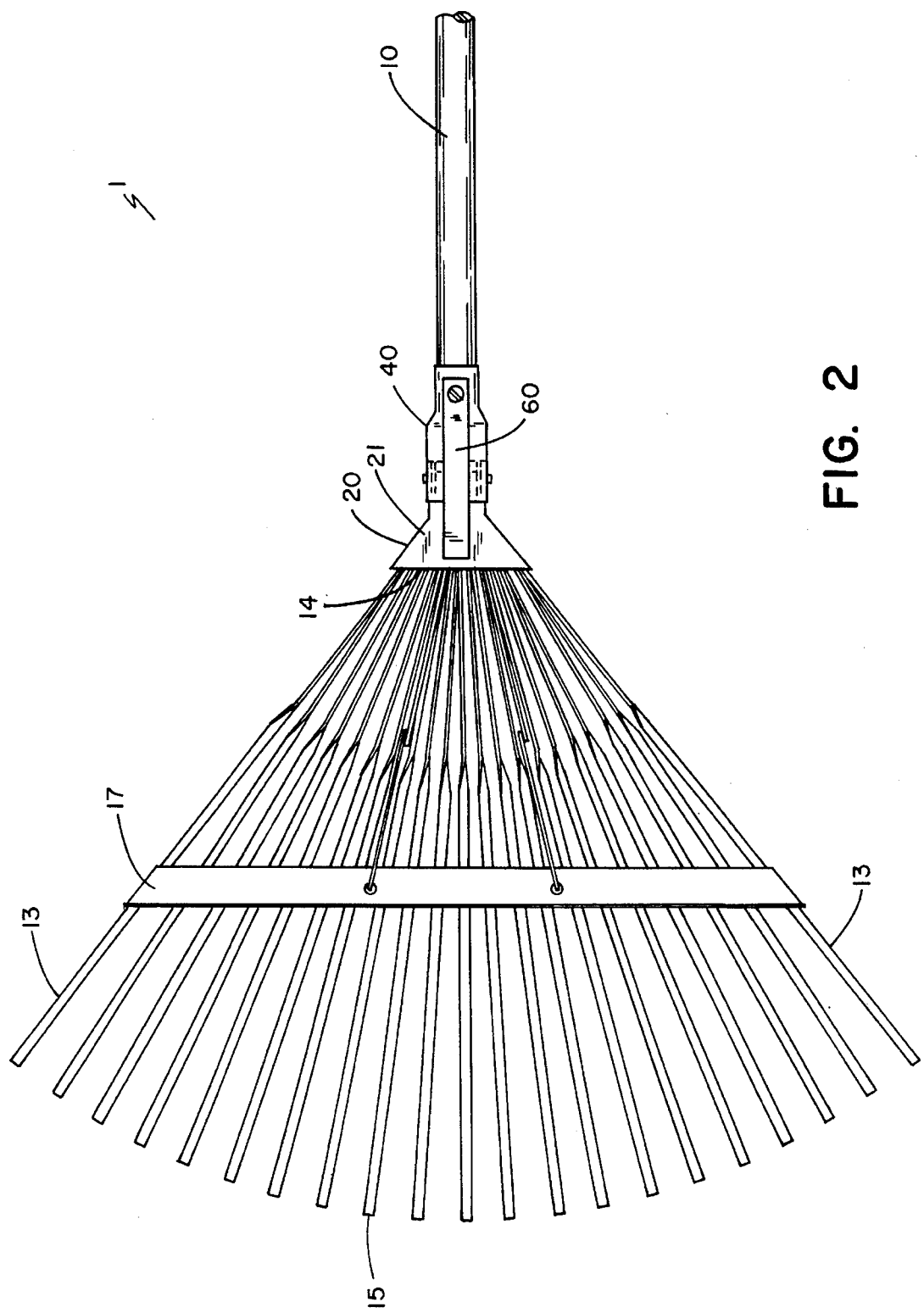
FIG. 2 is a top view of the rake of FIG. 1.

Referring to the drawings in detail wherein like elements are indicated by like numerals, there is shown an embodiment of the invention rake 1 incorporating a spring pivoting head. The invention rake 1 is comprised generally of a handle portion 2, a rake head 3, and a rake head engaging means 4 attached to said handle portion 2. The rake 1 has two modes of operation. The first mode is an "engaged" mode, designated as head position A in solid lines in FIGS. 1 and 3. The second mode is an "unengaged" mode, designated as head position B in broken lines in FIGS. 1 and 3. For purposes of exposition, the rake's longitudinal axis will be considered in a horizontal plane. The rake's tines 13 will be considered also to be collectively spread in the horizontal plane while in the fully "engaged" position. The rake's forward/distal direction will be from the handle portion 2 toward the rake head 3 and vice versa for the rearward direction. The rake's general bottom side and downward direction, is the direction from engaged to unengaged. The top side and upward direction is opposite the bottom side.

The rake handle portion 2 has a conventional shape and is comprised of an elongated cylindrical member 10 having a proximal end 11 and a distal end 12, said distal end 12 being near to the rake head 3. The member 10 is made of a smoothly textured wood, plastic or aluminum. The longitudinal axis of the member 10 is coincident with the longitudinal axis of the rake 1.

The rake head 3 has a conventional shape and is comprised of a plurality of flexible tines 13, each having a proximal end 14 and a distal end 15. Each tine distal end 15 terminates in a downwardly extending bent end 16. The tine proximal ends 14 terminate in and are attached to a tine retainer clip 20. The tines 13 are held in the same general plane by a tine guide 17 which is adapted to evenly spread apart the distances between the tines 13 gradually increasing the distances between tines 13 from their proximal ends 14 to their distal ends 15.

The retainer clip 20 has a flat top 21, bottom 22, and two sides 23, said top 21 and bottom 22 being in planes parallel to one another. The clip 20 has a forward fan-shaped hollow segment 24 and a rearward rectangular segment 30, said forward fan-shaped hollow segment 24 having a side-to-side 23–23 width increasing from its narrowest measure at the fan segment rear end 26 to its widest side-to-side 23–23 width at the fan segment forward end 25. The tine proximal ends 11 are inserted into the fan segment forward end 25 and fastened within said fan segment 24 at the fan segment rear end 26. The fan segment rear end 26 joins the rectangular segment front end 31. The rectangular segment sides 23' are parallel to each other. The rectangular segment top rear end 32 terminates in a flange element 33 extending downwardly at an acute angle in reference to the plane of the retainer clip top 21. At the junction of the rectangular segment top portion 21' and each side 23', a channel 34 is formed extending from the rectangular segment rear end 32 nearly to the rectangular segment front end 31. Each rectangular segment side 23' has an aperture 35 formed therein near to the rectangular segment rear end 32.

The rake head engaging means 4 is comprised of a handle interface element 40 and a spring element 60. The handle interface element 40 contains a generally hollow, conical-shaped segment 41 having a forward end 42 and a rearward end 43, said rearward end 43 being fitted over the distal end 12 of the handle elongated cylindrical member 10. The segment 41 may have a generally conical or cylindrical shape. In the embodiment of the invention shown, the segment 41 has a general conical shape. Said conical-shaped segment 41 has a top surface 44 and a bottom surface 46. The top surface 44 of the conical-shaped segment 41 gradually rises along the longitudinal axis from the conical segment forward end 42 to the rearward end 43. The conical-shaped segment 41 has an aperture 45 formed therein approximately midway along its longitudinal axis on both its top surface 44 and bottom surface 46. The forward end 42 of the conical segment 41 terminates in an open rectangular-shaped segment 50 having a flat top 51, two lateral, downwardly extending sides 52, a forward edge 53 and a rearward edge 54, the conical segment forward end 42 joining said rectangular segment rearward edge 54. Each side 52 has an aperture 55 formed therein near to the segment forward edge 53. The rectangular segment side-to-side 52-52 width is greater than the retainer clip rectangular segment side-to-side 23'-23' width.

The tine retainer clip 20 is joined to the handle interface element 40. This is accomplished by sliding the retainer clip rectangular segment rear end 32 against and beneath the handle interface element rectangular segment forward edge so that the retainer clip rectangular segment sides 23' slide between the handle interface element rectangular segment sides 52. The clip 20 and interface element 40 are positioned so that the clip apertures 35 and interface element apertures 55 coincide. A pin 57 is slid through the four apertures 35, 55 thereby joining the clip 20 with the interface element 40. The retainer clip rectangular segment flange element 33 is positioned over the pin 57 between the pin 57 and the interface element rectangular segment top An elongated, spring element 60 having a general longitudinal axis parallel to the general longitudinal axis of the rake 1 is attached to the interface element 40 and the handle member 10. The spring element 60 has a concave middle portion 66, a flat proximal portion 63 and a flat distal portion 64. The spring element is positioned so that the concave portion hollow interior part 61 is facing downward and the curved outer part 62 is facing upward. The spring element 60 has an aperture 65 formed in the proximal portion 63. The spring element 60 is positioned so that its aperture 65 is coincident with the handle interface element conical segment aperture 45. A retaining screw 47 is inserted into the spring element aperture 65, through the conical segment top surface aperture 45, and into the handle member 10. A head 49 on the retaining screw 48 holds the spring element proximal portion 63 tightly against the conical segment top surface 44. The spring element distal portion 64 is positioned so that it presses against the top 21 of the forward fan-shaped hollow segment 24. This results in the spring element 60 forcing the retainer clip 20 pivotally downward about the pin 57 while in an unengaged mode of operation.

Figure 3:
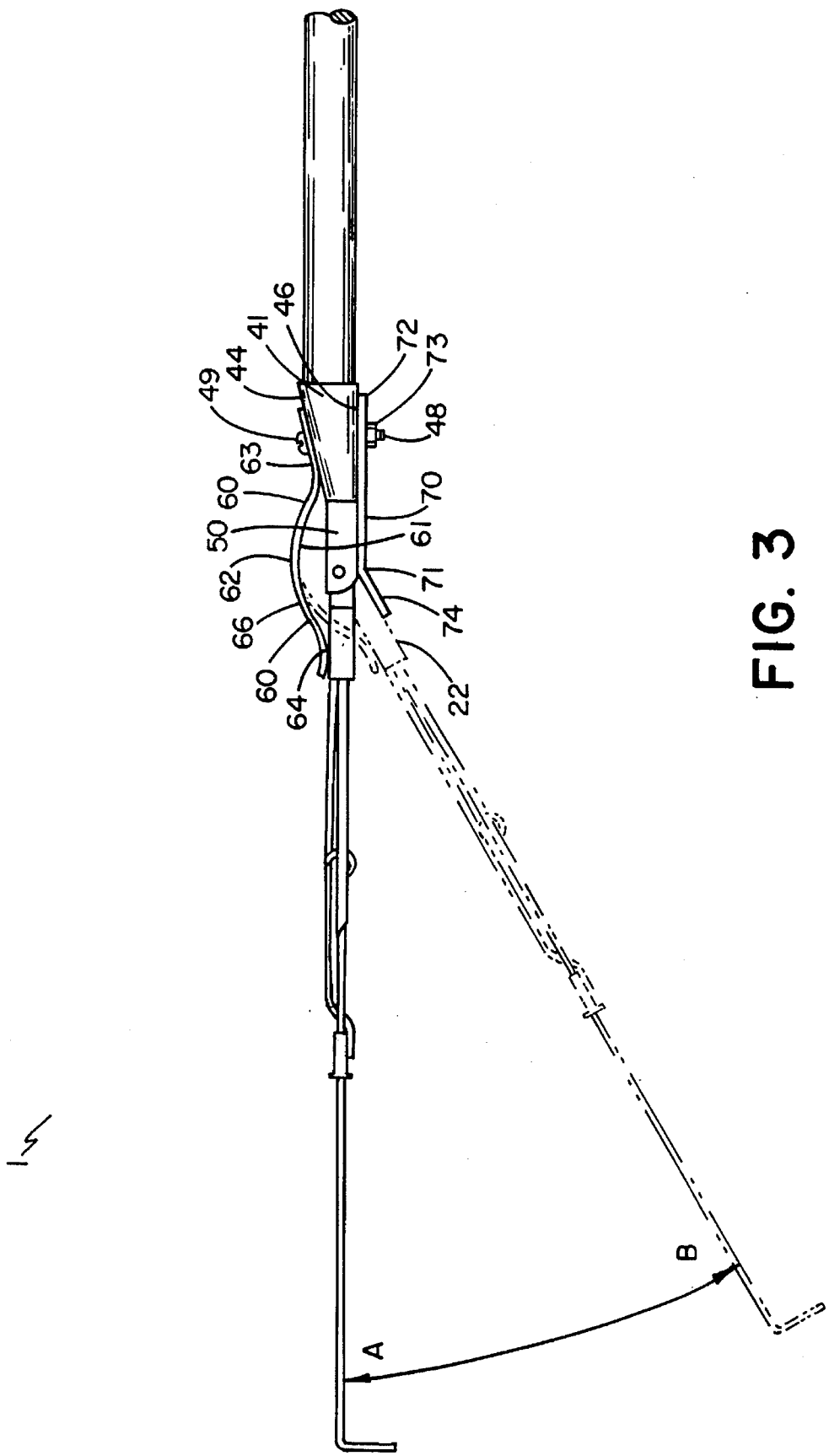
FIG. 3 is a side elevational view of the rake of FIG. 1.
Figure 4:
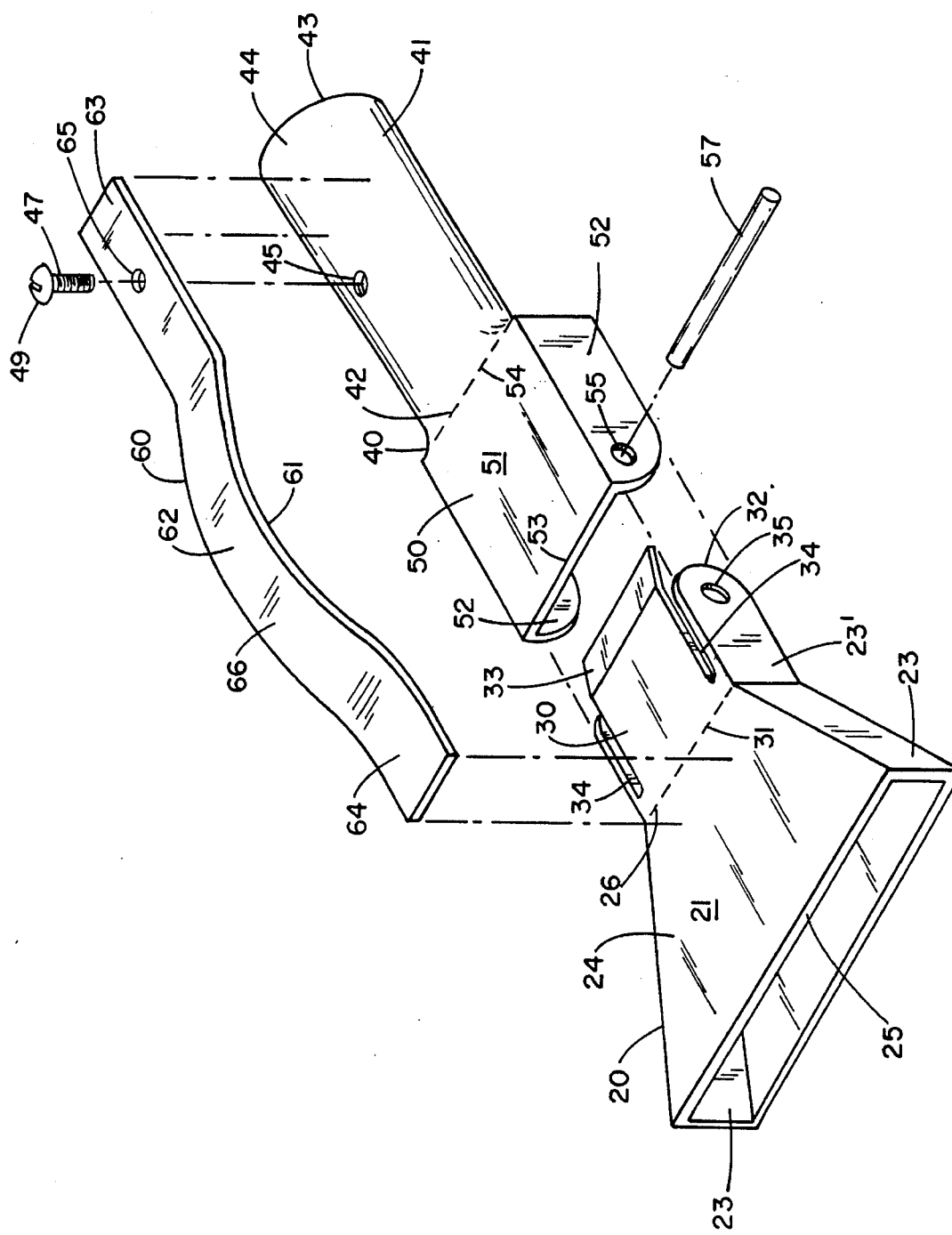
FIG. 4 is an exploded view of a preferred embodiment rake head engaging means.

As may be most clearly seen in FIG. 3, an alternative embodiment of the invention may include a longitudinal, generally flat, stopping element 70 attached to the bottom surface 46 of the conical-shaped segment 41. The stopping element 70 has a front end 71 and a rear end 72. An aperture (not shown) is formed in the stopping element 70 near to the element's rear end 72. The retaining screw 47 is threaded and protrudes through the handle member 10, through the aperture (not shown) in the conical segment bottom surface 46, and through the aperture (not shown) in the stopping element 70. A nut 73 threadingly engages the end 48 of the retaining screw 47 protruding through the stopping element 70 aperture, thereby holding the stopping element 70 snugly against the bottom surface 46 of the conical segment 41. The stopping element front end 71 terminates in a downwardly and forwardly sloping flange 74. The flange 74 forms an acute angle with the longitudinal axis of the stopping element 70. The degree of angle formed is determined by the desired head position B. The flange 74 limits the downward pivot of the rake head 3. Without the stopping element 70, the angle for position B is determined solely by the angle of the retainer clip rectangular segment flange element 33. The alternative embodiment with a stopping element 70 is particularly useful for heavier rakes or for rakes which will be used in heavy duty applications.

In operation, the rake head 3 has a normal unengaged position defined as position B in FIGS. 1 and 3. The spring element 60 urges the rake head 3 into position B which places the plane of the rake head 3 at an acute angle to the longitudinal axis of the rake handle 2. A raker's natural first raking motion with the present invention rake, will cause the tine bent ends 16 to engage the ground 7 and thereby cause rake head 3 to move to position A. The rake head 3 and rake handle 2 thereby acquire the same general longitudinal axis. This action straightens and tenses the spring element 60, thereby storing energy therein. A simple and small lifting motion of the rake 1 will release the energy in the spring element 60 causing the raking head 3 to return to its acute angle position B relative to the rake handle 3, thereby "throwing" any raked debris away from the bottom of the tines 13.

It is understood that the above-described embodiments are merely illustrative of the application. Other embodiments may be readily devised by those skilled in the art which will embody the principles of the invention and fall within the spirit and scope thereof.

I claim:

1. A lawn rake with spring pivoting head, comprising:

a rake head comprised of a plurality of flexible tines, each having a proximal end and a distal end, each tine distal end terminating in a bent end, said bent ends all being in the same direction, said tine proximal ends terminating in and being attached to a tine retainer clip, said tines being held in the same general plane by a tine guide which is adapted to evenly spread apart the distances between the tines gradually increasing the distances between tines from their proximal ends to their distal ends;

a handle portion comprised of an elongated cylindrical member having a proximal end and a distal end, said distal end being near to the rake head; and a rake head engaging means comprised of:
a handle interface element; and
an elongated, spring element having a concave middle portion, a flat proximal portion and a flat distal portion, said flat portions of the spring element having a general longitudinal axis parallel to the general longitudinal axis of the rake, said proximal portion being attached to the said interface element and said handle cylindrical member, and said distal portion being positioned to engage said retainer clip;
said tine retainer clip being pivotally joined to said handle interface element.

2. A lawn rake as recited in claim 1, wherein:

said handle interface element is comprised of:
a generally hollow, conical-shaped segment having a forward end and a rearward end, said rearward end being fitted over the distal end of the handle elongated cylindrical member, said conical-shaped segment having a top surface and a bottom surface, said conical-shaped segment top surface gradually rising along a longitudinal axis from the conical segment forward end to the rearward end, said conical-shaped segment having an aperture formed therein approximately midway along its longitudinal axis on both its top surface and bottom surface;
an open rectangular-shaped segment having a flat top, two lateral, downwardly extending sides, a forward edge and a rearward edge, said conical segment forward end joining said rectangular segment rearward edge, each said downwardly extending side having an aperture formed therein near to the rectangular-shaped segment forward edge.

3. A lawn rake as recited in claim 2, wherein:

said retainer clip has a flat top, bottom, and two sides, said top and bottom being in planes parallel to one another, said clip being further comprised of:

a forward fan-shaped hollow segment having a forward end and a rear end, and having a side-to-side width increasing from a narrowest measure at the fan-shaped hollow segment rear end to a widest side-to-side width at the fan-shaped hollow segment forward end, wherein the tine proximal ends are inserted into the fan-shaped hollow segment forward end and fastened within at the fan-shaped hollow segment rear end; and a rearward rectangular segment having a front end, rear end and two parallel sides, said rectangular segment front end being joined to said fan-shaped hollow segment rear end, said rectangular segment top rear end terminating in a flange element extending downwardly at an acute angle in reference to the plane of the retainer clip top, said rectangular segment having a channel formed at each junction formed between the rectangular segment top portion and a said side, each said channel extending from the rectangular segment rear end nearly to the rectangular segment front end, each rectangular segment side having an aperture formed therein near to the rectangular segment rear end, wherein the retainer clip rectangular segment side-to-side width is less than the handle interface element rectangular-shaped side-to-side width.

4. A lawn rake as recited in claim 3, wherein:

said retainer clip is inserted into said handle interface element so that the retainer clip rectangular segment rear end is positioned within said handle interface element rectangular-shaped segment forward edge so that said retainer clip side apertures and handle interface side apertures are coincident.

5. A lawn rake as recited in claim 4, further comprising:

a pin slidably inserted through said handle interface side apertures and retainer clip side apertures;

wherein said retainer clip rectangular segment flange element s positioned over the pin between the pin and the interface element rectangular segment top.

6. A lawn rake as recited in claim 5, wherein:

said spring element is positioned so that a concave portion hollow interior part is facing against said conical-shaped segment top surface and a curved outer part is facing away from said conical-shaped segment top surface.

7. A lawn rake as recited in claim 6, further comprising:

an aperture formed in the proximal portion of said spring element, said spring element being positioned so that said aperture is coincident with said aperture formed on the top surface of said conical-shaped segment;

a retaining screw inserted into said spring element aperture, through said aperture formed on the top surface of said conical-shaped segment, and into said handle member, said retaining screw having a head thereon larger than the spring element aperture;

wherein said spring element distal portion is positioned so that it presses against the top of the retainer clip.

8. A lawn rake as recited in claim 7, further comprising:

a longitudinal, generally flat, stopping element attached to the bottom surface of the conical-shaped segment.

9. A lawn rake as recited in claim 8, wherein:

said stopping element has a front end, a rear end, and an aperture formed in the stopping element near to the stopping element rear end, said stopping element front end terminating in a downwardly and forwardly sloping flange, said flange forming an acute angle with the longitudinal axis of the stopping element;

wherein said retaining screw is threaded and protrudes through the handle member, through the aperture in the conical-shaped segment bottom surface, and through the aperture in the stopping element;

a nut threadingly engaged to end of the retaining screw protruding through the stopping element aperture, thereby holding the stopping element snugly against the bottom surface of the conical segment.

* * * * *